(12) United States Patent
Hsiao et al.

(10) Patent No.: US 7,079,355 B2
(45) Date of Patent: Jul. 18, 2006

(54) MAGNETIC TRANSDUCER WITH A WRITE HEAD HAVING A MULTI-LAYER COIL

(75) Inventors: Richard D. Hsiao, San Jose, CA (US); Quang Le, San Jose, CA (US); Edward Hin Pong Lee, San Jose, CA (US); Paul Phong Nguyen, San Jose, CA (US); Son Van Nguyen, Los Gatos, CA (US); Denny D. Tang, Saratoga, CA (US); Bradley Douglas Webb, San Jose, CA (US); Patrick Rush Webb, San Jose, CA (US); Samuel Wei-san Yuan, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 256 days.

(21) Appl. No.: 10/812,720

(22) Filed: Mar. 29, 2004

(65) Prior Publication Data

US 2004/0190196 A1 Sep. 30, 2004

Related U.S. Application Data

(62) Division of application No. 10/279,169, filed on Oct. 23, 2002, now Pat. No. 6,804,879.

(51) Int. Cl.
*G11B 5/147* (2006.01)

(52) U.S. Cl. ........................................ 360/126

(58) Field of Classification Search ................ 360/126, 360/119, 122, 123; 29/603.24, 603.23, 603.25, 29/603.16, 603.18
See application file for complete search history.

(56) References Cited

U.S. PATENT DOCUMENTS

| 4,110,114 A | 8/1978 | Sato |
| 4,336,316 A | 6/1982 | Sato |
| 5,936,814 A | 8/1999 | Slade et al. |
| 6,018,862 A * | 2/2000 | Stageberg et al. ....... 29/603.14 |
| 6,121,150 A | 9/2000 | Avanizano et al. |
| 6,194,323 B1 | 2/2001 | Downey et al. |
| 6,260,256 B1 | 7/2001 | Sasaki |
| 6,804,879 B1 * | 10/2004 | Hsiao et al. ............. 29/603.24 |
| 2006/0002024 A1 * | 1/2006 | Le et al. ..................... 360/126 |
| 2006/0010684 A1 * | 1/2006 | Lee et al. ................ 29/603.15 |

* cited by examiner

*Primary Examiner*—Allen Cao
(74) *Attorney, Agent, or Firm*—G. Marlin Knight

(57) ABSTRACT

A method for producing a magnetic transducer with an inductive write head having a multilayer coil with a high aspect ratio and a short yoke is disclosed. A damascene process is used for two coil layers and a conventional process for the third coil layer. The process of the invention allows a seed layer for the coil to be deposited on the side walls of the trenches for the first and second coil layers. In one embodiment the seed layer for the coil is preceded by an adhesion layer.

15 Claims, 7 Drawing Sheets

MAGNETIC TRANSDUCER WITH A WRITE HEAD HAVING A MULTI-LAYER COIL

RELATED APPLICATIONS

This is a divisional application currently application bearing Ser. No. 10/279,169 which was filed on Oct. 23, 2002 now U.S. Pat No. 6,804,879.

Pending U.S. patent application published as US20020093762A1: "Method for seed layer removal for magnetic heads," which is hereby incorporated by reference, presents related concepts of seed and adhesion layer materials and processes.

The damascene process used herein is described in detail in the commonly assigned U.S. patent application bearing Ser. No. 10/115,414 which is hereby incorporated by reference.

Commonly assigned U.S. patent application titled "Magnetic Transducer with Pedestal Pole Piece Structure" bearing Ser. No. 09/884607, which is hereby incorporated by reference, describes a tri-layer coil write head embodiment with a pedestal P1 pole piece defining the zero-throat height which is used in the preferred embodiment of the invention described in this application.

FIELD OF THE INVENTION

The invention relates to the field of magnetic transducers (heads) having inductive write heads and more particularly to the structure of and the process for making the pole pieces and coils for the inductive write head.

BACKGROUND OF THE INVENTION

A typical prior art disk system 10 is illustrated in FIG. 1. In operation the magnetic transducer 20, usually called a "head" is attached to an arm or actuator 13 and flies above the rotating disk 16. A voice coil motor 19 (VCM) pivots the actuator 13 to position the magnetic transducer 20 over selected circumferential tracks on the disk 16. The disk 16 is attached to spindle 18 that is rotated by a spindle motor (not shown). The disk 16 comprises a substrate on which a plurality of thin films are deposited. The thin films include ferromagnetic material that is used to record the magnetic transitions written by the magnetic transducer 20 in which information is encoded. A tape based storage system (not shown) uses a magnetic transducer in essentially the same way as a disk drive, with the moving tape being used in place of the rotating disk 16.

The magnetic transducer 20 is composed of elements that perform the task of writing magnetic transitions (the write head 23) and reading the magnetic transitions (the read head 12) as illustrated in FIG. 2. The electrical signals to and from the read and write heads 12, 23 travel along conductive paths (leads) (not shown) which are attached to or embedded in the actuator 13. Typically there are two leads each 14 for the read and write heads 12, 23.

FIG. 2 is a midline section of one type of prior art magnetic transducer 20A. The components of the read head 12 are the first shield (S1), two insulation layers 107, 109 which surround the sensor element 105 and the second shield 104 (P1/S2). This type of magnetic transducer 20A is called a "merged head" because the P1/S2 layer 104 serves as a shield for the read head 12 and a pole piece for the write head 23A. The yoke also includes a second pole piece 103 (P2) which connects with P1/S2 104 away from the air-bearing surface (ABS) at what is sometimes called the "back gap" (BG). The P2 103 confronts the P1 104 across the write gap layer 42 to form the write gap 43 at the ABS. The coil 37 in this particular prior art head is deposited on a layer of resist 106 which is used to define the zero throat height (ZTH) by forming a step on the gap layer 42.

FIG. 3 is a midline section of a second type of prior art magnetic transducer 20B. There are two significant differences between the magnetic transducers 20A and 20B in FIGS. 2 and 3. One difference is that the yoke in magnetic transducer 20B includes three pole pieces P1 104, P2 103A and P3 103B. The P2 103A is formed at the write gap 43 a separate element. The third pole piece 103B (P3) is stitched to P2 103A and is connected to the P1 104 at the back gap (BG) to complete the yoke. Typically write heads 23 only have one coil layer 37, but the particular write head 23B shown has two coil layers which be called coil1 37 and coil2 57. The turns of both coil1 and coil2 are routed between the write gap 43 and the back gap (BG) and then around behind the yoke. Coil1 and coil2 are connected electrically (typically behind the back gap) to form a single inductive coil. The P3 103B arches over the resist mound 111 which surrounds the coil(s). In either of the prior art write heads 23A, 23B the angle at which the bottom surface of P2 moves away from the ZTH point is typically far less than 90 degrees which results in efficiency losses through flux leakage.

In either of the prior art heads 20A, 20B of FIGS. 2 and 3 additional coil layers can formed on top of the previous coils prior to forming the enclosing pole piece. Thus, three or more coil layers can be made within these basic designs. Adding additional coil layers, however, will not change the fundamental limitations on the yoke lengths in these heads.

As the required recording densities increase the width of the written track must decrease. The needed write heads must have high magnetic efficiency and low inductance. These requirements make it necessary to place the inductive components ever closer to the pole tips than is possible using the prior art.

In U.S. Pat. No. 6,194,323 to Downey and Yen, a process for making semiconductors is disclosed that uses a so-called hard mask. The hard mask is selected to be more resistant to the metal etchant being used, which in turn allows a thinner photoresist to be used with a resulting increase in resolution. The hard mask is deposited on the metal layer and a thin photoresist is deposited on the hard mask and patterned in the convention manner. The hard mask is then etched to expose portions of the metal layer that can then be etched to achieve the desired pattern of metal. The materials useful for the hard mask are said to include titanium nitride, silicon nitride, tungsten, titanium, various glasses, tantalum oxide, aluminum oxide, titanium oxide, as well as, organic hard masks such as spin-on anti-reflection coatings.

One process for forming a pattern of material with sub-micron dimensions is called the damascene process. In this method the pattern is developed by etching away selected dielectric material to form features (vias, troughs, etc.) that are then overfilled by electroplating a metal such as copper. The overfill is removed by chemical-mechanical polishing (CMP) leaving the metal and dielectric material forming the pattern. Hard masks have been used to improve the precision of the damascene process. In U.S. Pat. No. 6,121,150 Avanzino and Wang suggest use of sputter-resistant materials for the hard mask. Specifically, they teach the use of high atomic mass metallic materials such Ta, W, Ti, TaN, WN and TiN for the hard mask in a damascene process for fabricating semiconductors.

SUMMARY OF THE INVENTION

A method for producing a magnetic transducer with an inductive write head having a multilayer coil with a high aspect ratio and a short yoke is disclosed. A damascene process is used for two coil layers and a conventional process for the third coil layer. The process of the invention allows a seed layer for the coil to be deposited on the side walls of the trenches for the first and second coil layers. In one embodiment the seed layer for the coil is preceded by an adhesion layer.

In a preferred embodiment of the invention the first coil layer is formed below the gap layer and behind a pedestal pole piece for P1. A layer of polymeric material is deposited to serve as the bed for the turns of the coil. A layer stack including a hard mask layer followed by a masked photoresist layer defines the coil shape and enables etching (RIE) with a high aspect ratio. Tantalum oxide is preferred as the hard mask material. A seed layer is then deposited over the resulting trenches. This process results in the seed layer being deposited on the sidewalls as well as the bottoms of the trenches. In an alternate embodiment an adhesion layer may be deposited prior to the deposition of the seed layer. Tantalum is the preferred adhesion layer and copper is the preferred seed layer for the coil. A wet electroplating process is preferred to deposit the conductive material for the coil on the wafer to overfill the trenches. The first coil layer is completed when the overfill is removed by planarization. The gap layer is then formed. The second layer of the coil is formed above the gap layer and behind the P2 pole piece using the same method as was used for the first coil layer. The third coil layer may then be formed by a conventional process. The write head is completed with the formation of the P3 pole piece to complete the yoke.

BRIEF DESCRIPTION OF THE DRAWINGS

FIG. 4 includes the area in front and back of the yoke.

FIG. 5 and subsequent figures include only the area between the pole tips and the yoke.

DETAILED DESCRIPTION OF THE INVENTION AND THE PREFERRED EMBODIMENTS

Figure 1:
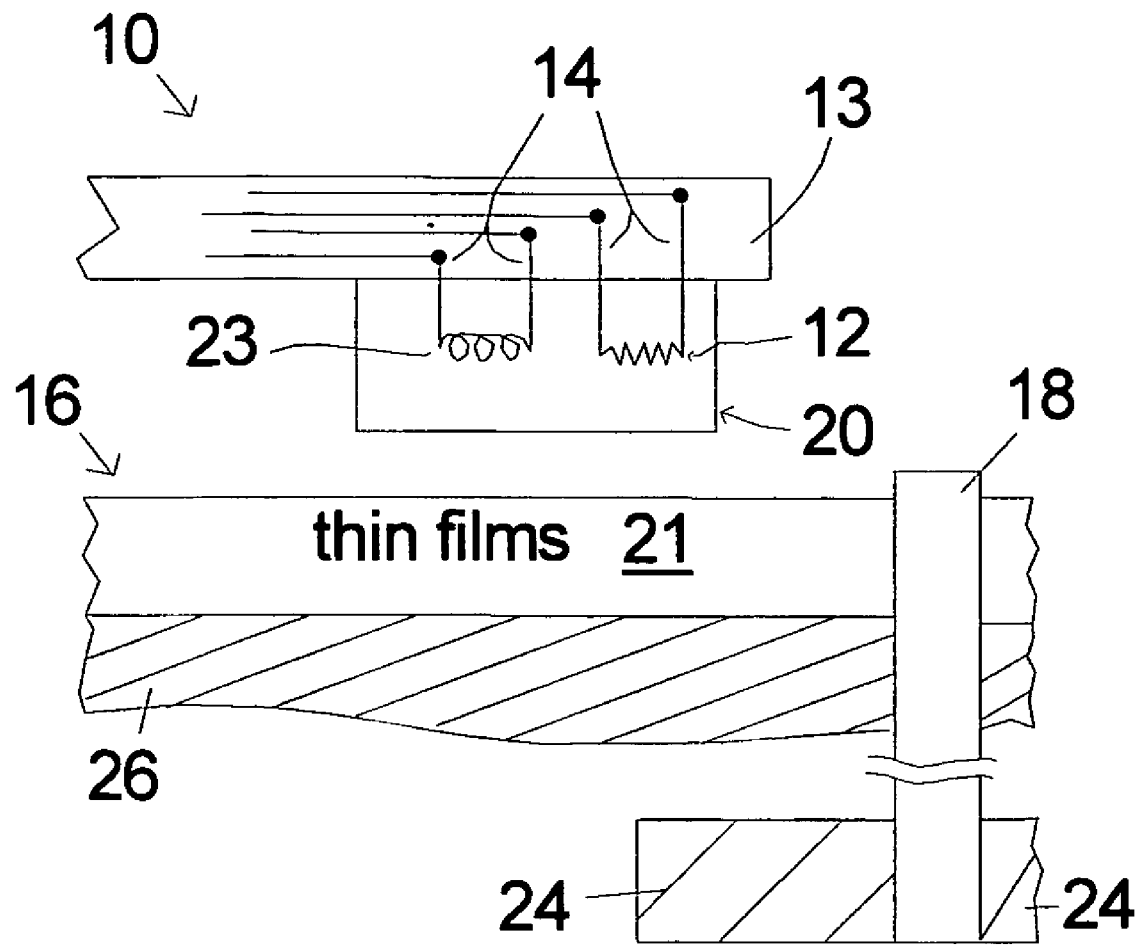
FIG. 1 is a symbolic illustration of a prior art disk drive in which the head of the invention can be embodied, showing the relationships between the head and associated components.
Figure 2:
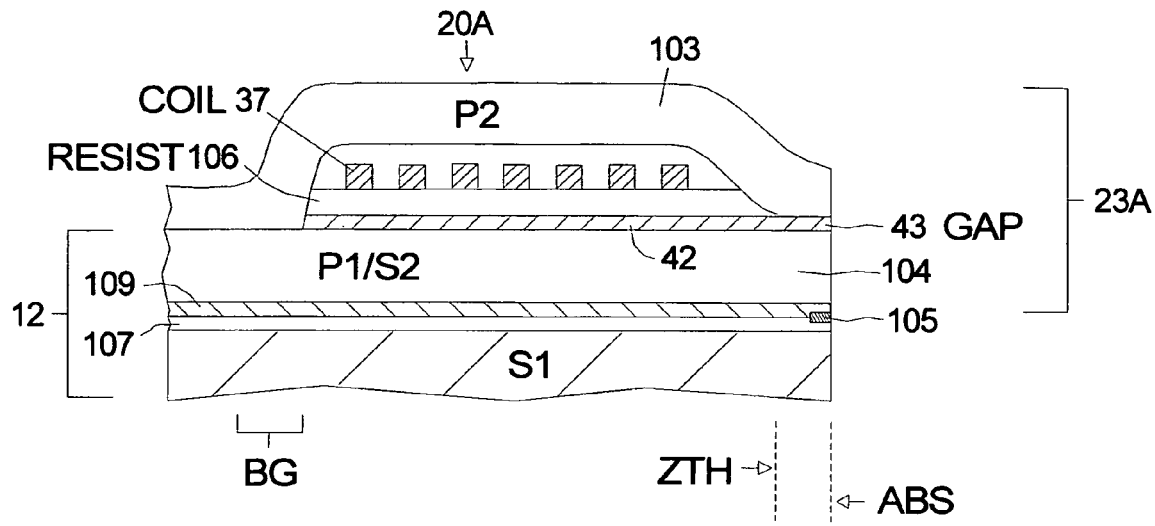
FIG. 2 illustrates a section, perpendicular to the air bearing surface, of a prior art magnetic transducer with one coil layer.
Figure 3:
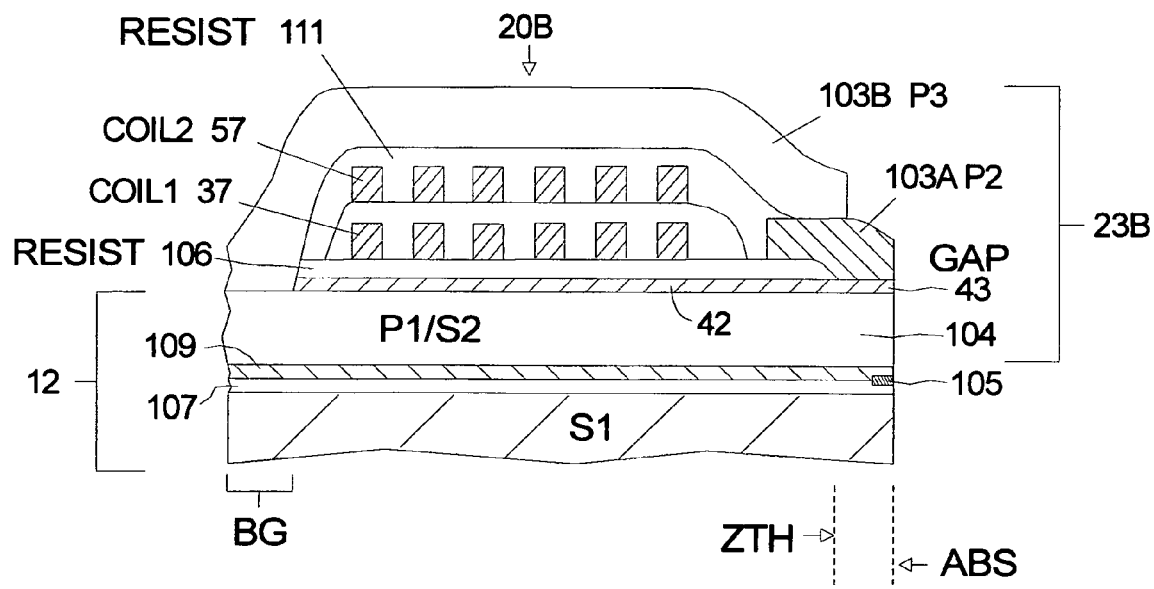
FIG. 3 illustrates a section, perpendicular to the air bearing surface, of a prior art magnetic transducer with two coil layers.

It is conventional for thousands of heads to be manufactured simultaneously on a single wafer. For simplicity the following will typically describe the actions or structures for a single head, but it is to be understood that most of the process steps are performed over the entire wafer and are, therefore, forming structures for thousands of heads simultaneously. The invention relates to the write head portion of the magnetic transducer and does not place limits on the type of read head that can be used with it. Typically the read head portion of the transducer is fabricated first, but transducers with the write head portion fabricated first have been described in the prior art. A write head according to the invention may be fabricated before or after the read head portion of the transducer.

The relative sizes of the components shown in the figures are not presented according to scale, since the large range of sizes would make the drawing unclear. The relative sizes/thickness of the components are according to prior art principles except where noted below. The hatching lines are not intended to represent the material composition of a structure, but are used only to distinguish structures and aid in the explanation of the process of making the write head.

One embodiment of the damascene process as described can be summarized as follows. A polymeric material is deposited on an insulating layer which may be the substrate. The polymeric material serves as the fill material between the metallic structures. A layer stack is then deposited to serve the masking function. The layer stack begins with a dielectric layer, which is also called a hard mask, such as SiOx. An optional adhesion layer may be placed on the dielectric layer. A masked photoresist layer is then applied to define the metallic structures and complete the layer stack. The wafer is then etched by a method such as reactive-ion etching (RIE) to remove the material from the areas from the polymeric material defined for the metallic structures. A conductive, conformal seed layer is then applied to the etched surface. The bulk metal is deposited in a wet plating process which builds a non-conformal film, overfilling the trenches. Chemical-mechanical polishing (CMP) is then used to remove material down through the hard mask and to planarize the surface. The result is a metallic pattern surrounded with an insulating material. Aspect ratios of 7 to 10 may be obtained using this method.

The process of the invention allows a tri-layer coil to be made with a higher aspect ratio than the process of the prior art. If the second layer of the coil is fabricated with a conventional through-mask method, planarization will be disrupted by the coil when fabricating the P2 poletip. On the other hand, if the P2 poletip is fabricated first, then there will be too much redeposition onto P2 during the coil seed layer removal and P2 disrupts the planarization for the second layer of the coil. The process of the invention overcomes these problems.

Figure 4:
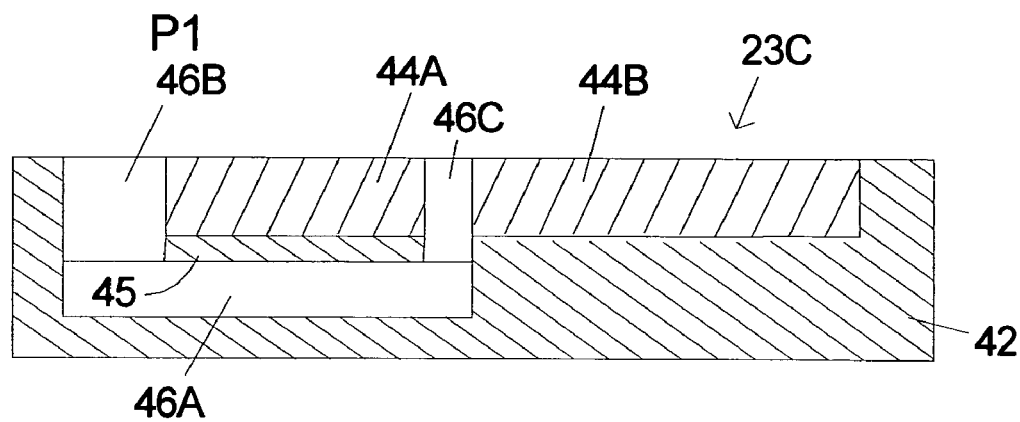
FIG. 4 illustrates a partially formed section of a magnetic transducer according to the invention, perpendicular to the air-bearing surface, during fabrication after three subpieces of the first pole piece have been formed.

Reference is made to FIG. 4 to begin the description of the process of making a first embodiment of a write head 23C of the invention. Prior art materials and techniques have been used to form the structures shown. The section view is perpendicular to the air bearing surface (ABS) (not shown) which will be on the left of the figure after the wafer is sliced. Only a portion of one transducer relating to the write head is shown. The elements for the read head (not shown) will be fabricated in coordination with the write head and as noted a plurality of other transducers (not shown) are being fabricated in parallel on the wafer. The first pole piece (P1) 46A–C has been deposited in three segments, on a generally planar surface of substrate 42 and is made of standard ferromagnetic material. The P1 subpiece 46B will also be called a "P1 pedestal pole piece" to follow the terminology of commonly assigned U.S. patent application titled "Magnetic Transducer with Pedestal Pole Piece Structure" bearing Ser. No. 09/884,607, which describes the advantages of a pedestal P1 pole piece which include defining the zero-throat height.

The upper surface of the wafer which includes the upper surfaces of insulating material 44A, 44B is preferably planarized to establish a well controlled surface for the subsequent formation of the first coil (coil1) (not shown). Achieving the smallest pitch in coil1 requires that P1 also be planarized. The polymeric insulating material 44A, 44B (preferably hard-bake resist) will serve as the bed for the first coil layer. The thickness of the polymeric insulating material 44A, 44B limits the height of the coil turns. Insulating layer 45 serves to insulate the first coil layer from the first segment of P1 46A. Insulating layer 45 is a material such as alumina which will act as a stop for the subsequent RIE process.

Figure 5:
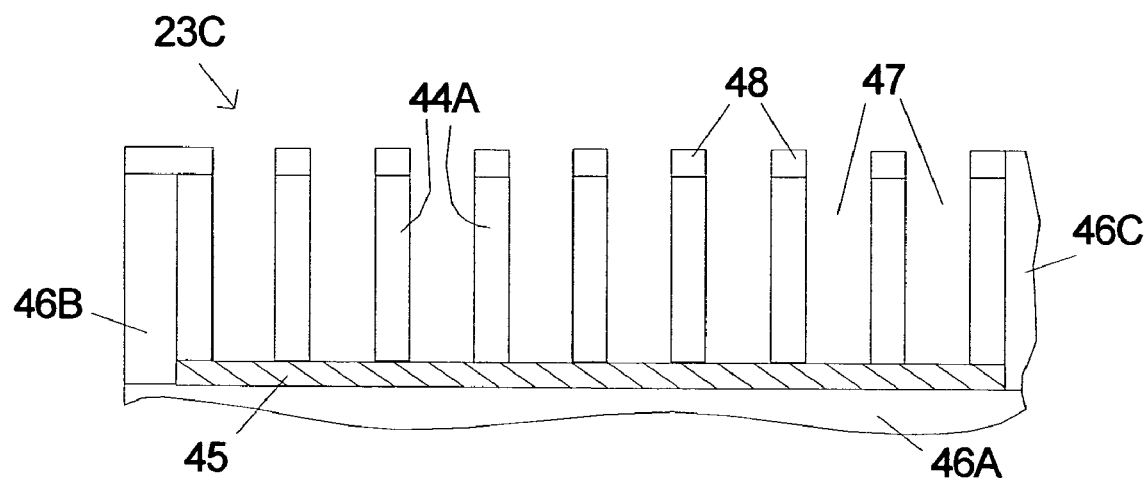
FIG. 5 illustrates a partially formed section of a transducer according to the invention subsequent to FIG. 4 in the fabrication process, after the masking layer stack has been formed and etched for the first coil layer.

FIG. 5 is an enlarged view of the area between the P1 pole subpieces 46B, 46C of FIG. 4 after additional steps in the fabrication process have been performed. The portion of the write head 23C behind the P1 pole subpiece 46C is not shown in FIG. 5 to simplify the drawing. The turns of the coil behind the P1 pole subpiece 46C will be similar to those shown. FIG. 5 shows the trenches 47 which have been etched through the layer stack 48. As noted above, the layer stack 48 includes a plurality of layers (not shown): a dielectric hard mask layer (and optionally an adhesion layer may be placed on the hard mask layer); and a masked photoresist layer which is used to define the coil turns. The preferred material for the dielectric hard mask is tantalum oxide. Prior art dielectric materials such as silicon dioxide may also be used. Applicants have found that tantalum oxide has superior etch resistance to the RIE process and, therefore, provides increased precision to the resolution. The wafer is etched by a method such as reactive-ion etching (RIE) to remove the material from the trenches 47 defined for the subsequent metallic structures.

Figure 6A:
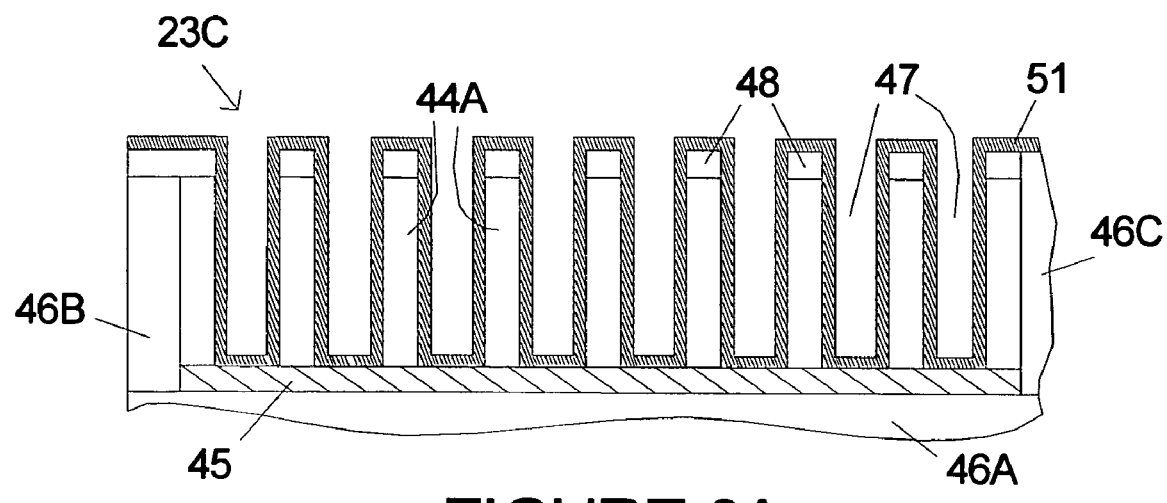
FIG. 6A illustrates a partially formed section of a transducer according to the invention subsequent to FIG. 5 in the fabrication process after the seed layer has been deposited for the first coil layer.
Figure 6B:
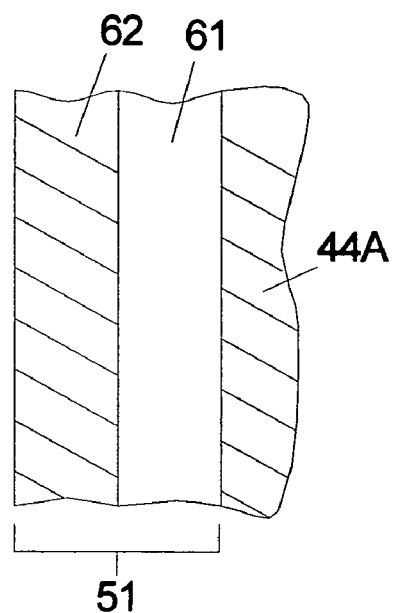
FIG. 6B illustrates an enlarged view of the details of one embodiment of the seed layer structure 51 as shown in FIG. 6A.

FIG. 6A illustrates the preferred next step in the process which is the deposition of a seed layer structure 51. The thickness of the seed layer has been greatly exaggerated in relation to the other films. As will be readily known by those skilled in the art, the seed layer structure 51 is much thinner than the other layers and if shown to scale would not be visible. The seed layer structure 51 is shown in FIG. 6B which is an enlarged view of a side wall from FIG. 6A. The seed layer structure 51 must include at least a seed layer 62, but may also include additional layers. The seed layer material is selected using prior art methods based on the material for the subsequent plated deposition of the conductive coil which is preferably copper. If electroplating is used then the seed layer must be conductive. A sputtered layer of copper can used as the seed layer 62. A preferred process uses the two layers for the seed layer structure 51 as shown in FIG. 6B. In this embodiment an adhesion layer 61 is deposited prior to the seed layer 62. In this embodiment a very thin layer of tantalum is sputter-deposited prior to the layer of copper. Tantalum nitride (TaN) may also be used as the adhesion layer 61. When deposited according to the invention the seed layer 62 and adhesion layer 61 are deposited on the sidewalls of the trenches, as well as, the bottoms. This is in contrast to prior art methods which have seed layer material only at the bottom of the trench. This allows the aspect ratio of the coil to be larger than in the prior art. For example, aspect ratios up to eight (8) are achievable using the method and materials according to the invention, whereas, aspect ratios of three (3) are the limit of the prior art. Higher the aspect ratios allow shorter overall yokes or lower coil resistance with resulting increases in performance.

Figure 7:
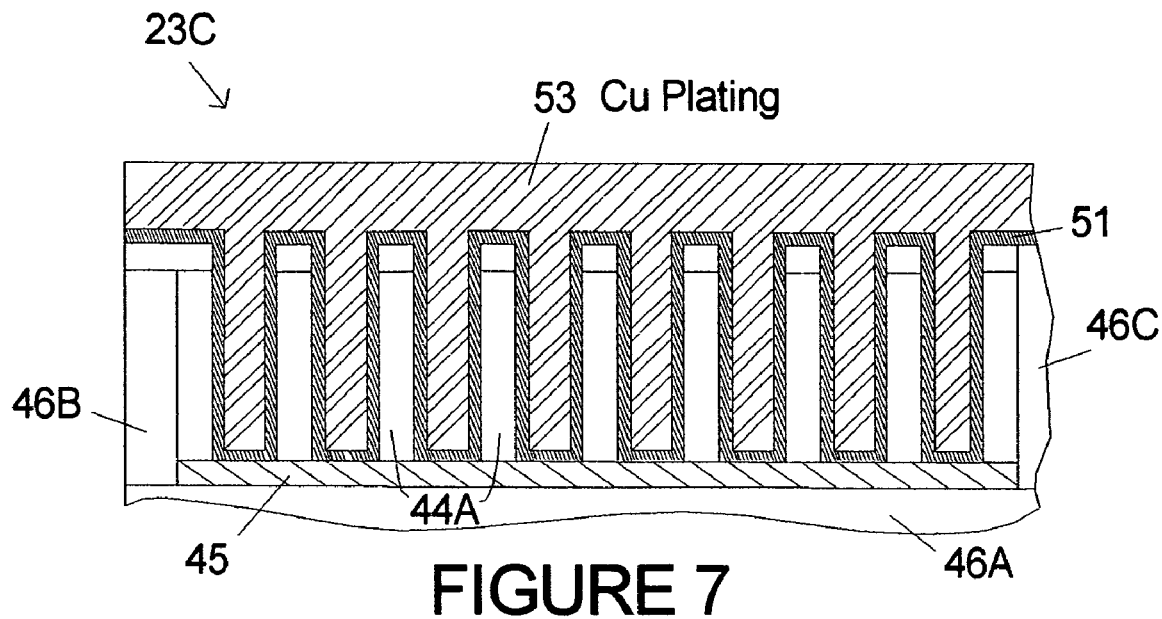
FIG. 7 illustrates a partially formed section of a transducer according to the invention subsequent to FIG. 6 in the fabrication process after the conductive material (Cu) has been deposited for the first coil layer.
Figure 8:
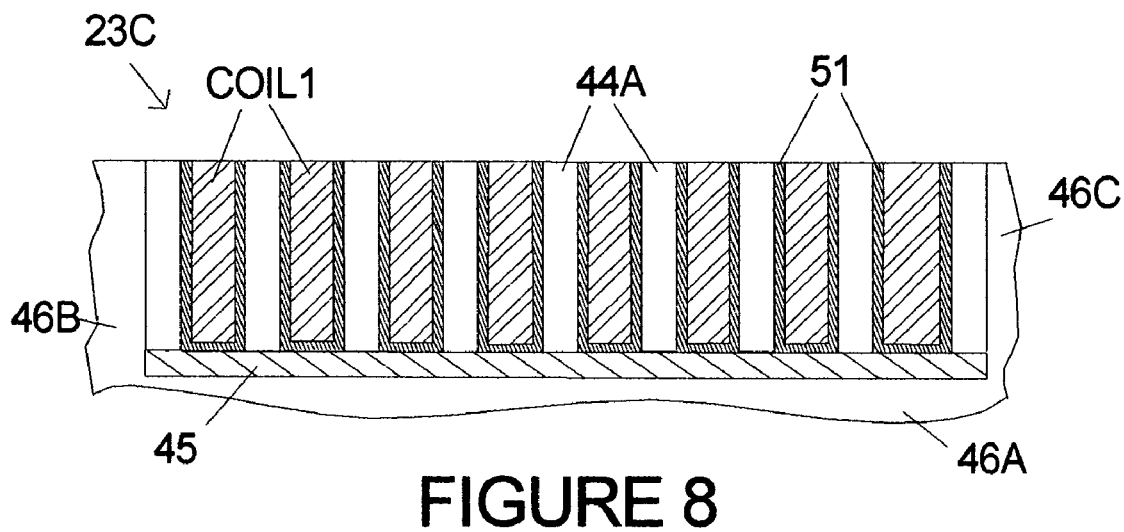
FIG. 8 illustrates a partially formed section of a transducer according to the invention subsequent to FIG. 7 in the fabrication process after the surface has been planarized leaving the turns of the first coil layer separated.

In FIG. 7 the result of wet thin film electroplating the copper 53 for the coil is shown. This deposition process allows a nonconformal film to be formed overfilling the trenches. At this point CMP is used to planarize the surface down to the level of the pedestals of insulating material 44A as shown in FIG. 8. At this point the turns of the first layer of the coil (coil1) have been formed by the remaining copper 53 in the trenches.

Figure 9:
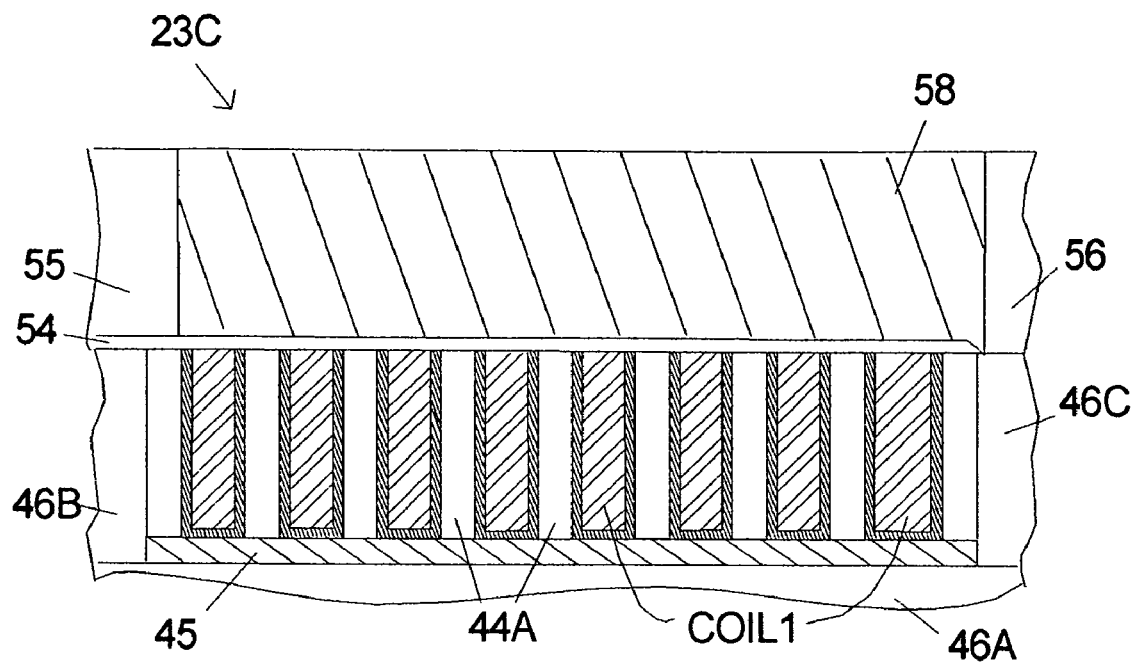
FIG. 9 illustrates a partially formed section of a transducer according to the invention subsequent to FIG. 8 in the fabrication process after the gap layer and the bed for the second coil layer has been formed.

The state of the process shown in FIG. 9 is subsequent to several additional process steps after the state shown in FIG. 8. In FIG. 9 a gap layer 54 has been deposited on the planarized surface and then etched to form a via exposing the top of the P1 subpiece 46C. The gap layer 43 is formed from a dielectric material, for example, alumina which is not removed by RIE. The back pole piece of P2 56 has been formed in the via over the P1 subpiece 46C to continue the continuity of the ferromagnetic material comprising the yoke and serve as a back flux closure of ferromagnetic material. The front P2 pole piece 55 has been deposited on the gap layer 54 to confront the P1 subpiece 46A to form the write gap. The front P2 pole piece 55 extends toward to the back of the yoke farther than the pedestal pole piece 46B to allow the ZTH to be defined by the pedestal pole piece 46B. The bed of insulating material 58 for the second layer of the coil (not shown) has been deposited and the surface has been planarized.

Figure 10:
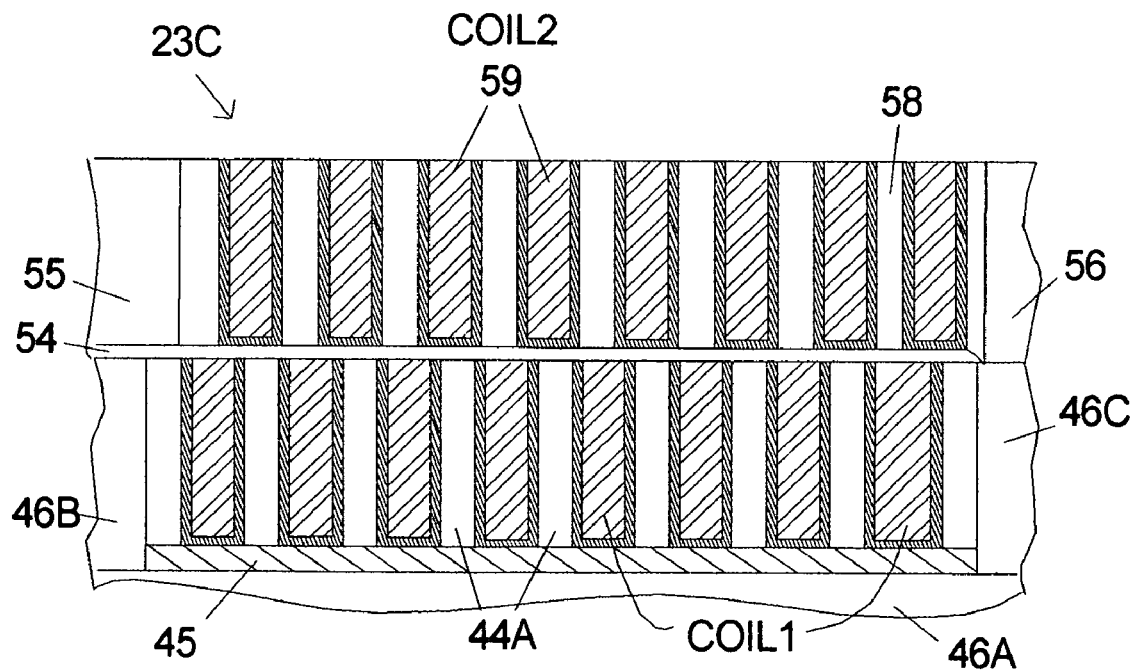
FIG. 10 illustrates a partially formed section of a transducer according to the invention subsequent to FIG. 9 in the fabrication process after seed layer deposition, Cu plating and planarization of the second coil layer.
Figure 11:
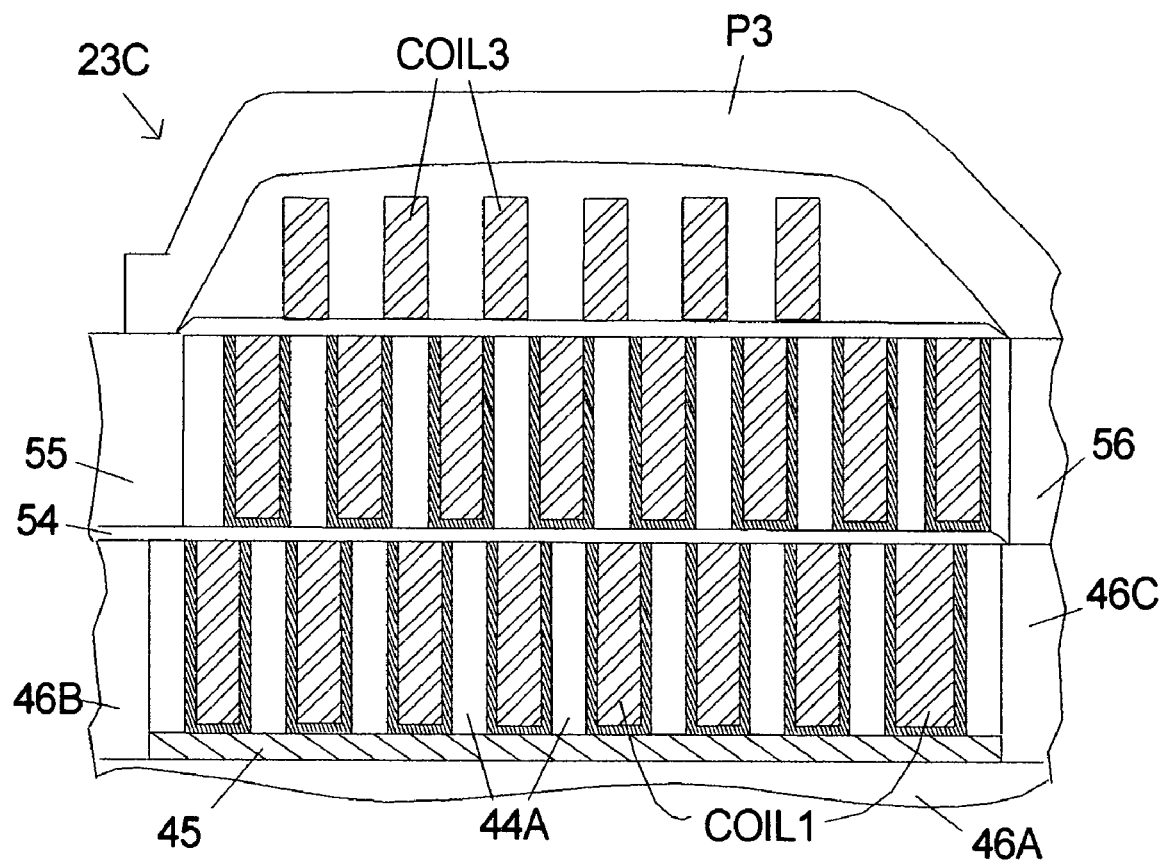
FIG. 11 illustrates a section of a transducer according to the invention subsequent to FIG. 10 in the fabrication process after the third coil layer and P3 pole piece have been formed.

The process of fabricating second layer of the coil is the same as for the first layer of the coil. FIG. 10 shows the completed second layer of the coil 59 (coil2) after planarization. FIG. 11 shows the completed write head with insulating layer 59 deposited over the coil2 tops to encapsulate coil3 which can be fabricated by conventional prior art methods. Similarly P3 is formed of ferromagnetic materials according to prior art to complete the yoke. The three layers comprising the coil are preferably connected in series.

Although the invention does not depend on particular dimensions, some comments about the preferred dimensions may be instructive. For example, the preferred pitch of the coil turns is from 0.5 to 1.5 microns. The height of the first and second coil layers is preferably from 2 to 5 microns. The length of the yoke is from 7 to 15 microns. The preferred width of P2 is less than 0.5 microns.

Other variations and embodiments according to the invention will be apparent to those skilled in the art which will nevertheless be with the spirit and scope of the invention.

What is claimed is:

1. A magnetic transducer with an inductive write head comprising:
    a gap layer extending from a write gap toward a back of a yoke;
    a pedestal pole piece of a ferromagnetic material which is in contact with the gap layer at the write gap, a back surface of the pedestal pole piece defining a zero throat height line;
    a first coil layer including a plurality of turns of an electrically conductive material which pass between the pedestal pole piece and the back of the yoke, the turns of the electrically conductive material of the first coil layer being separated by an insulating material having sidewalls with a first seed layer thereon;
    a second coil layer including a plurality of turns of electrically conductive material which pass between a P2 pole piece and the back of the yoke, the turns of the electrically conductive material of the second coil layer being separated by the insulating material having sidewalls with a second seed layer thereon; and
    a third coil layer including a plurality of turns of the electrically conductive material which pass between a P3 pole piece and the back of the yoke.

2. The magnetic transducer of claim 1 further comprising an adhesion layer between the first seed layer and the insulating material.

3. The magnetic transducer of claim 2 wherein the adhesion layer is tantalum.

4. The magnetic transducer of claim 2 wherein the adhesion layer is tantalum nitride.

5. The magnetic transducer of claim 1 wherein the first seed layer is copper.

6. The magnetic transducer of claim 1 wherein an aspect ratio of the first coil layer is greater than three.

7. The magnetic transducer of claim 1 wherein an aspect ratio of the first coil layer is approximately eight.

8. A disk drive comprising:
    a disk having a thin film of a ferromagnetic material on a planar surface of the disk;
    a spindle rotatably supporting the disk;
    an actuator supporting a magnetic transducer having an air bearing surface confronting the planar surface of the disk; and
    the magnetic transducer including a write head comprising:
    a pedestal pole piece of a ferromagnetic material which is in contact with a gap layer at a write gap, a back surface of the pedestal pole piece defining a zero throat height line;
    a first coil layer including a plurality of turns of an electrically conductive material which pass between the pedestal pole piece and a back of a yoke, the turns of the electrically conductive material of the first coil layer being separated by an insulating material having sidewalls with a first seed layer thereon;
    a second coil layer including a plurality of turns of the electrically conductive material which pass between a P2 pole piece at the write gap and the back of the yoke, the turns of the electrically conductive material of the second coil layer being separated by the insulating material having sidewalls with a second seed layer thereon; and
    a third coil layer including a plurality of turns of the electrically conductive material which pass between a P3 pole piece connected to the P2 pole piece and the back of the yoke.

9. The disk drive of claim 8 wherein an aspect ratio of the first coil layer is greater than three.

10. The disk drive of claim 8 wherein an adhesion layer is disposed between the first seed layer and the insulating material.

11. The disk drive of claim 10 wherein the adhesion layer is tantalum.

12. The disk drive of claim 10 wherein the adhesion layer is tantalum nitride.

13. The disk drive of claim 8 wherein the first seed layer is copper.

14. The disk drive of claim 8 wherein an aspect ratio of the first coil layer is greater than three.

15. The disk drive of claim 8 wherein an aspect ratio of the first coil layer is approximately eight.

* * * * *